United States Patent Office 3,422,096
Patented Jan. 14, 1969

3,422,096
SPIRO[ESTRENE/ANDROSTENE-17,2'-OXETANE]-3-ONE AND INTERMEDIATES
Edward A. Brown, Wilmette, Ill., assignor to G. D. Searle & Co., Chicago, Ill., a corporation of Delaware
No Drawing. Filed Aug. 8, 1967, Ser. No. 659,002
U.S. Cl. 260—239.55                              1 Claim
Int. Cl. A61k 17/06; A01n 9/28

ABSTRACT OF THE DISCLOSURE

Preparation of the captioned compounds, such as spiro[estr-4-ene-17,2'-oxetane]-3-one, and their valuable pharmacological properties, including anti-estrogenic and anti-algal activities and the capacity to reverse the renal electrolyte effects of desoxycorticosterone acetate, are disclosed.

---

This invention relates to spiro[estrene/androstene-17,2'-oxetane]-3-one and intermediates, and to processes for the preparation thereof. More particularly, this invention provides new, useful, and unobvious chemical compounds of the formula

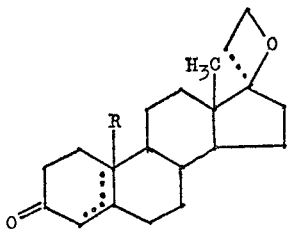

wherein R represents hydrogen or methyl and the dotted line in ring A represents $\Delta^4$ unsaturation except when R represents hydrogen, in which circumstance either $\Delta^4$ or $\Delta^{5(10)}$ unsaturation obtains.

The compounds to which this invention relates are useful by reason of their valuable pharmacological properties. Thus, for example, they reverse the effects of desoxycorticosterone acetate (DCA) on urinary sodium and potassium; and, like progesterone, they inhibit the stimulatory effects of estrogens on growth of the uterus. Moreover, one of the intermediates whereby the foregoing compounds are prepared, 3-methoxyspiro[estra-2,5(10)-dien-17,2'-oxetane], is not only useful as such, but also by virtue of its anti-algal activity in respect of such organisms as *Chlorella vulgaris*.

The capacity of the instant compounds to reverse the renal electrolyte effects of DCA is evident from the results of standardized tests for this property carried out in rats substantially as described by C. M. Kagawa in Chapter 34 Volume II of "Evaluation of Drug Activities: Pharmacometrics," by D. R. Laurence and A. L. Bacharach. Details are as follows.

A group (Group I) of 8 male Badger Research Corp. rats, each weighing between 150 and 200 gm., is adrenalectomized and maintained thereafter on sugar cubes and tap water ad libitum overnight. Each animal is thereupon subjected to these successive treatments; (a) 0.009 mg. of DCA dissolved in 0.1 ml. of corn oil is injected subcutaneously; (b) 2.4 mg. of test compound dissolved in 0.5 ml. of corn oil or other physiologically inert solvent, e.g. water, is injected subcutaneously; (c) 2.5 ml. of aqueous approximately 9% sodium chloride is injected subcutaneously. Urinary sodium and potassium are measured by customary techniques on samples of urine collected during the 4 hr. immediately following treatment. Controls are provided by second and third groups of 8 each 150-200 gm. male Badger Reseach Corp. rats concurrently and identically treated expecting that in Group II, 0.33 mg. of spironolactone is substituted for the test compound, while in Group III neither test compound nor spironolactone is administered. DCA produces sodium (Na) retention, loss of potassium (K), and a corresponding reduction in the mean log Na×10/K. Spironolactone serves as an index of the validity of the test, the dose of 0.33 mg. having been shown to induce a 50% reversal of the effects of the DCA. Hofman et al., Arch. int. Pharmacodyn., 1965, 476 (1967). Kagawa, in Endocrinology 74, 724 (1964), reported a standard error of ±0.084 per 4-rat response, determined from a large number of tests and based on 60 degrees of freedom, for the mean log Na×10/K measurement. From this it can be calculated that the least significant difference (P<0.05) in mean log Na×10/K between 2 groups of 8 rats each is ±0.168. It follows that when mean log Na×10/K for Group I is equal to or greater than that for Group II, and the latter in turn exceeds the value for Group III by at least 0.168 log unit, the reversals of the renal electrolyte effects of DCA represented thereby are significant. Results of tests by the foregoing procedure on spiro[estr-4-ene-17,2'-oxetane]-3-one, the product of Example I hereinafter, are summarized in Table I.

Table I.—Mean log Na×10/K

| | |
|---|---|
| Group I | 1.17 |
| Group II | 1.05 |
| Group III | 0.86 |

Those skilled in the art will recognize that observations of activity in standardized tests for particular pharmacological effects as hereinbefore set forth are fundamental to the development of valuable new drug products, both veterinary and human.

Spiro[estr-4-ene-17,2'-oxetane]-3-one can be prepared from 17β,21-dihydroxy-19-nor-17α-pregn-4-en-3-one upon consecutive and prolonged contact of the latter compound with p-toluenesulfonyl chloride in pyridine and potassium t-butoxide in t-butyl alcohol. The isomeric ester-5(10)-ene eventuates from Reformatsky condensation of estrone 3-methyl ether with ethyl bromoacetate, reduction of the resultant ester to the corresponding alcohol with lithium aluminum hydride, consecutive and prolonged contact of the alcohol with p-toluenesulfonyl chloride and potassium t-butoxide as before to form the spiro ring, Birch reduction of ring A to afford 3-methoxyspiro[estra-2,5(10)-diene-17,2'-oxetane], and hydrolytic rearrangement of this enol ether with a dilute solution of acetic acid in aqueous methanol. Spiro[androst-4-ene-17,2'-oxetane]-3-one can be prepared by heating 17α-pregn-5-ene-3β,17β,21-triol with 2,2-dimethoxypropane in the presence of p-toluenesulfonic acid monohydrate to yield the cyclic 17,21-acetal, subjecting the acetal to Oppenauer oxidation, and treating the resultant 4-ene-3-one with p-toluenesulfonyl chloride and potassium t-butoxide to give the spiro product.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

Spiro[estr-4-ene-17,2'-oxetane]-3-one.—A solution of 50 parts of 17β,21-dihydroxy-19-nor-17α-pregn-4-en-3-one and 50 parts of p-toluenesulfonyl chloride in 500 parts of pyridine is maintained at room temperatures for 24 hours, then poured into 2500 parts of ice water. The gummy precipitate which forms is filtered off and taken up in 450 parts of benzene. The benzene solution is dried over anhydrous sodium sulfate, whereupon the benzene is distilled off in vacuo and the residue taken up in 780 parts of warm t-butyl alcohol. The alcohol solution is cooled to 25°, at which point 53 parts of potassium t-butoxide is introduced. The resultant mixture is maintained at room temperatures for 24 hours, then diluted with 210 parts of ether. The solution thus obtained is washed several times with water and finally with saturated aqueous sodium chloride. The solution is then dried over anhydrous sodium sulfate and stripped of solvent by vacuum distillation. The reside is spiro [estr-4-ene-17,2′-oxetane]-3-one which, upon recrystallization from ethyl acetate melts at 130–134°. The product has the formula

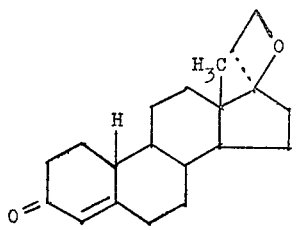

Example 2

(A) Ethyl 17β - hydroxy - 3 - methoxyestra-1,3,5(10)-trien-17α-ylacetate.—A mixture of 10 parts of 3-methoxy-estra-1,3,5(10)-trien-17-one [estrone 3-methyl ether], 22 parts of ethyl bromoacetate, 14 parts of 20-mesh zinc, and 88 parts of benzene is stirred at the boiling point under reflux for 2 hours, then chilled. Zinc is filtered out and washed with benzene, the wash liquor being added to the filtrate. The resultant solution is stirred into an ice-cold mixture of 24 parts of concentrated hydrochloric acid and 500 parts of water, whereupon the benzene phase is separated and the aqueous phase extracted with ether. The ether and benzene solutions are combined, washed with water, dried over anhydrous sodium sulfate, and stripped of solvent by vacuum distillation. The oily residuce, together with 8 parts of gacial acetic acid and 8 parts of (carboxymethyl)trimethylammonium chloride hydrazide, is heated at the boiling point under reflux for 30 minutes. The resultant solution is mixed with 12 parts of sodium bicarbonate dissolved in 400 parts of water. The precipitate thrown down is filtered off, washed with water, dried in air, and recrystallized from methanol to give ethyl 17β-hydroxy-3-methoxyestra-1,3,5(10)-trien-17α-ylacetate melting at 102–104°.

(B) 3-methoxy - 19 - nor-17α-pregna-1,3,5(10)-triene-17,21-diol.—A suspension of 25 parts of lithium aluminum hydride in 710 parts of anhydrous ethyl ether is stirred at the boiling point under reflux for 30 minutes, whereupon a solution of 50 parts of ethyl 17β-hydroxy-3-methoxyestra-1,3,5(10)-trien-17α-ylacetate in 820 parts of anhydrous ethyl ether is stirred in during 10 minutes. The resultant mixture is stirred at the boiling point under reflux for 3 hours, at which point 90 parts of ethyl ether saturated with water and 30 parts of water are consecutively and cautiously introduced. Insoluble solids are then filtered off and mixed with 2000 parts of water, approximately 300 parts of concentrated hydrochloric acid, and 1490 parts of chloroform. The mixture is stirred for 3 hr., whereupon the chloroform phase is separated, washed with water, dried over anhydrous sodium sulfate, and stripped of solvent by vacuum distillation. The residue is 3-methoxy-19-nor - 17α - pregna-1,3,5(10)-triene - 17,21-diol melting at approximately 162–163°.

(C) 17β - hydroxy-3-methoxyestra-1,3,5(10)-trien-17-ethyl p-toluenesulfonate.—A solution of 8 parts of 3-methoxy - 19 - nor-17α-pregna-1,3,5(10)-triene-17,21-diol and 8 parts of p-toluenesulfonyl chloride in 80 parts of pyridine is maintained at room temperatures for 18 hr., then poured into 1000 parts of ice water. The resultant precipitate is filtered off, washed with water, dried in air, and chromatographed on silica gel, using benzene and ethyl acetate as developing solvents. From an eluate comprising 2% ethyl acetate in benzene, on evaporation of solvent and recrystallization of the residue from ethyl acetate, 17β-hydroxy-3-methoxyestra-1,3,5(10)-trien-17-ethyl p-toluenesulfonate melting at approximately 147–148° is obtained.

(D) 3 - methoxyspiro[estra-1,3,5(10)-triene-17,2′-oxetane].—To 15 parts of 17β-hydroxy-3-methoxyestra-1,3,5(10)-trien-17-ethyl p-toluenesulfonate in 545 parts t-butyl alcohol is added 15 parts of potassium t-butoxide. The resultant mixture is stirred at the boiling point under reflux for 3½ hours, then cooled to room temperature and partitioned between ethyl ether and water. The ethereal phase is separated, dried over anhydrous sodium sulfate, and stripped of solvent by distillation. The residue, recrystallized from a mixture of benzene and hexane, affords 3-methoxyspiro[estra-1,3,5(10) - triene - 17,2′-oxetane] melting at approximately 109–110°.

(E) 3 - methoxyspiro[estra - 2,5(10) - diene-17,2′-oxetane].—To a stirred solution of 10 parts of 3-methoxyspiro[estra-1,3,5(10)-triene-17,2′-oxetane] in 270 parts of tetrahydrofuran, 240 parts of t-butyl alcohol, and 420 parts of liquid ammonia is added, during 10 minutes, 6 parts of lithium wire. Stirring is continued for 2 hours after the addition is complete, at which point 20 parts of methanol is cautiously introduced during 20 minutes. After a further 10 minutes, decoloration ensues, whereupon ammonia is allowed to evaporate during 16 hours. At this point, 500 parts of water is added; non-aqueous solvents are removed by vacuum distillation; and the precipitate which eventuates is filtered off, washed with water, dried in air, and recrystallized from cyclohexane to afford 3-methoxyspiro[estra-2,5(10)-diene-17,2′-oxetane] melting at 112–118°.

(F) Spiro[estr-5(10)-ene-17,2′-oxetane]-3-one.—To a suspension of 1 part of 3-methoxyspiro[estra-2,5(10)-diene-17,2′-oxetane] in 12 parts of methanol at the boiling point under reflux is added, with agitation, a solution of 2 parts of acetic acid in 3 parts of water. Heating at the boiling point under reflux with agitation is continued for 15 minutes, at which point a clear solution eventuates and 30 parts of hot (55°) water is thereupon immediately stirred in. The resultant cloudy solution is allowed to cool to room temperature and then refrigerated at 5° for 18 hours. The oil which separates is taken up in 27 parts of ethyl acetate. The ethyl acetate solution is washed with water, dried over anhydrous sodium sulfate, and stripped of solvent by vacuum distillation. The residue is chromatographed on silica gel, using benzene and ethyl acetate as developing solvents. From an eluate comprising 2% ethyl acetate in benzene, on evaporation of solvent, spiro[estr-5(10)-ene-17,2′-oxetane]-3-one is obtained as an oily residue which crystallizes on appropriate contact with ethyl acetate. The product has the formula.

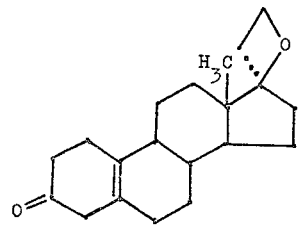

Example 3

(A) 17α-pregn-5-ene - 3β,17β,21 - triol cyclic 17,21-acetal with acetone.—A solution of 200 parts of 17β,21- dihydroxy-17α-pregn-5-en-3β-ol, 1 part of p-toluenesulfonic acid monohydrate, and 400 parts of dimethylformamide in approximately 1350 parts of 2,2-dimethoxypropane is stirred at the boiling point under reflux for 6 hours, then cooled to room temperature and diluted thereat with 1500 parts of water. The resultant mixture is refrigerated at 5° for 18 hours, whereupon the precipitate thrown down is filtered off, washed with water, dried in air, and recrystallized from methanol to give 17α-pregn-5-ene-3β,17β,21-triol cyclic 17,21-acetal with acetone melting at 203–205°.

(B) 17β-21-dihydroxy - 17α - pregn-4-en-3-one.—To a solution of 67 parts with 17α-pregn-5-ene-3β,17β,21-triol cyclic 17,21-acetal with acetone and 380 parts of cyclohexanone in 2970 parts of dry toluene at the boiling point under reflux in a nitrogen atmosphere is added, with stirring, a solution of 67 parts of aluminum isopropoxide in 990 parts of dry toluene. The resultant mixture is heated at the boiling point under reflux in a nitrogen atmosphere with stirring for 30 minutes, at which point 1000 parts of water is introduced and the mixture thus obtained steam distilled to remove non-aqueous solvents. To the oily distillant is added 50 parts of 10% hydrochloric acid. The resultant mixture is cooled to room temperature, and the oil separated therein is removed and taken up in 240 parts of boiling methanol. From the methanol solution, on cooling, 17β,21-dihydroxy-17α-pregn-en-3-one crystallizes. Further purified by recrystallization from ethyl acetate, it melts at 209–214°.

(C) Spiro[androst-4-ene-17,2'-oxetane]-3-one.—A solution of 30 parts of 17β,21-dihydroxy-17α-pregn-4-en-3-one and 30 parts of p-toluenesulfonyl chloride in 300 parts of pyridine is allowed to stand at room temperatures for 42 hours, then poured into 5000 parts of ice water. The gummy precipitate thrown down is filtered off and taken up in a mixture of 1800 parts of benzene and 710 parts of ethyl ether. The resultant solution is washed with water, dried over anhydrous sodium sulfate, and stripped of solvent by vacuum distillation. The residue is dissolved in 780 parts of warm t-butyl alcohol. The alcohol solution is cooled to 25°, whereupon 31 parts of potassium t-butoxide is introduced. The mixture thus obtained is allowed to stand at room temperatures for 20 hours, whereupon 1775 parts of ethyl ether is added. The solution is then washed repeatedly with water and finally with aqueous saturated sodium chloride, dried over anhydrous sodium sulfate, and stripped of solvent by vacuum distillation. The oily residue crystallizes on contact with ethyl acetate. Recrystallization from ethyl acetate affords spiro[androst-4-ene-17,2'-oxetane]-3-one melting at 178–180°. The product has the formula

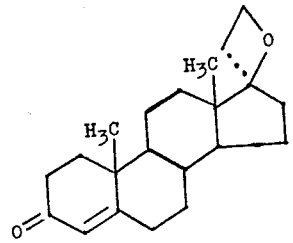

What is claimed is:
1. 3-methoxyspiro[estra-2,5(10)-diene-17,2'-oxetane].

References Cited

FOREIGN PATENTS 1,041,534  9/1966  Great Britain.

LEWIS GOTTS, *Primary Examiner.*

ETHEL G. LOVE, *Assistant Examiner.*

U.S. Cl. X.R.

260—397.1, 397.5, 397.47, 999; 71—67